Patented Mar. 16, 1948

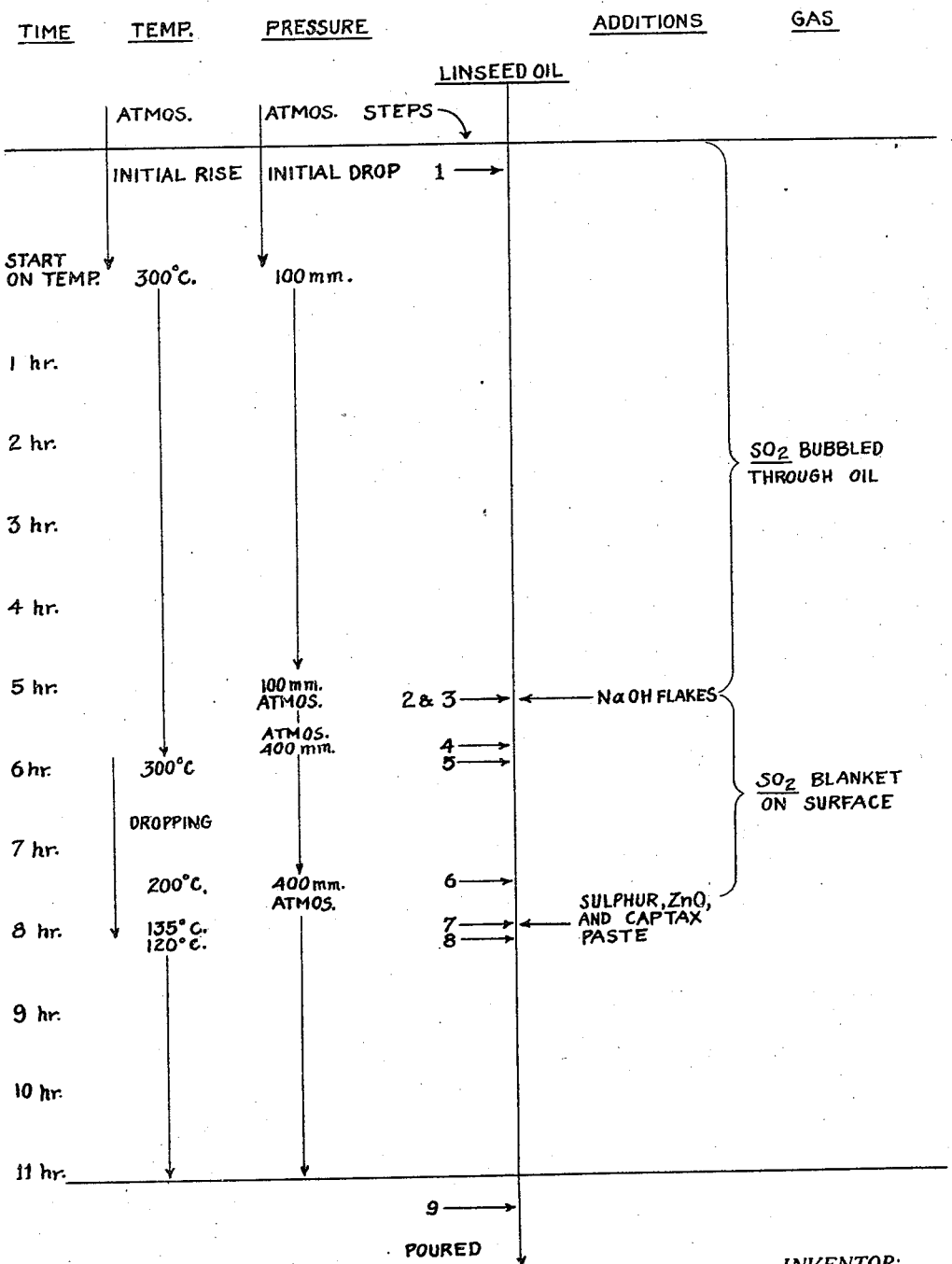

2,437,925

UNITED STATES PATENT OFFICE 2,437,925

PROCESS FOR MAKING RUBBER EXTENDERS

Laszlo Auer, South Orange, N. J., assignor to Ridbo Laboratories, Inc., Paterson, N. J., a corporation of New Jersey Application April 18, 1942, Serial No. 439,513

24 Claims. (Cl. 260—399)

This invention relates to an improved process for producing heat-bodied and vulcanized fatty oil products.

Although the products produced in accordance with the invention are adapted for use for many different purposes, the invention is of especial importance in producing rubber-like products, and while some of the products may be used per se, they are particularly adapted for use as rubber "extenders"—that is, added to rubber mixes.

Vulcanized oils or factice have been used heretofore in rubber mixes, but for reasons which will fully appear as this description proceeds, the product produced in accordance with the present invention has properties which are very different from those of the so-called factice. In general, the products obtained in accordance with the present invention have characteristics which are much more like those of rubber than the characteristics possessed by factice. In consequence, the material produced in accordance with the present invention may be used in rubber mixes in much higher percentages than was practicable with factice materials. My improved product, therefore, is more truly a rubber "extender." In various rubber mixes, depending upon the particular use for which the rubber is being prepared, the rubber extender produced in accordance with this invention may be used in amounts, for instance, from about 2 to 100 parts for each 100 parts of rubber.

In order to fully bring out the improvements provided by the present invention, brief reference is here made to the prior practice in use of factice, sometimes also called "rubber substitutes."

Factice is commonly produced merely by vulcanizing a fatty oil with sulphur. The resulting vulcanized product was then employed in rubber mixes, during the compounding on the rubber mill. In general, the purposes for employing such factice are one or more of the following:

1. In the case of extrusion compounds, for instance for rubber tubing, factice has been used to form a gel skeleton to prevent deformation of the tubing during vulcanization in open steam. The reason for this use is that factice does not appreciably change consistency at rubber vulcanization temperatures and, therefore, prevents deformation of the tubing during vulcanization.
2. Factice has been used as a filler, for instance for the purpose of reducing the cost of the rubber compound whenever the factice price was cheaper than the rubber price.
3. Although factice has only a very minute plasticizing influence, it was sometimes used for this effect in rubber compounding.

In addition to the above, it may be mentioned that plasticizers, such for example as pine tar oil, mineral oils, etc., having a much more powerful plasticizing effect than factice, have been used in rubber mixes in order to reduce the stiffness of the mix on the mill and to act as a lubricant, thereby enabling incorporation of larger quantities of fillers than otherwise possible, or accelerating the milling operation, or both.

The quantity of factice and plasticizers which can be incorporated in the mix is, however, severely limited by the fact that they are not vulcanizable at the vulcanization temperature of rubber. Some plasticizers, in fact, are not vulcanizable at all. Therefore, if these materials (factice and plasticizers) be added in large proportions, the original characteristics of the added material, especially the plasticizing characteristic, remains in the final product even after the final vulcanization thereof. The desired physical properties of the rubber product are thereby considerably impaired.

According to the present invention, a rubber compounding material is produced which is both an extender and a plasticizer, having better plasticizing characteristics than factice. The vulcanization temperature of my improved extender approximates that of rubber itself, in consequence of which the final vulcanization of the rubber product, after compounding on the mill, not only changes the characteristic of the rubber but also of the extender. The plasticizing characteristic of the extender is thereby eliminated, or at least greatly reduced, so that the desired properties in the final rubber product are not impaired.

Because of the foregoing, and also for other reasons, my improved extender may be employed in very much larger proportions than is possible with factice.

It is also of importance that the extender produced in accordance with my improved process has unusually good "nerve" or "life" and, upon prolonged elongation, will not take a "permanent set" of any appreciable magnitude. These factors are also of importance in enabling increase in proportions of extender used in most types of mixes.

A further object lies in the production of an extender of lighter color than most prior materials of this nature. This is of great importance for certain rubber products.

The invention is also of advantage since the primary starting material employed in accordance therewith is relatively inexpensive and readily available and, in addition, the treating agents and the like employed in the process are likewise inexpensive and readily available.

A further object of the invention is the provision of a treatment process which, considered as a whole, is relatively simple and readily carried out with known types of equipment. Many individual steps of this process have distinctive advantages and, in addition, a number of steps are interrelated in a special way affording still other advantages, all as will more fully appear hereinafter.

The process is described hereinafter as applied to one particular primary starting material (linseed oil), although it is to be understood that other fatty oils may be employed, with appropriate variations in procedure, as will further appear. However, let it here be pointed out that among suitable primary starting materials, the following typical fatty oils may be mentioned:

Tung oil
Oiticica oil
Linseed oil
Perilla oil
Sunflower oil
Poppyseed oil
Soya bean oil
Walnut oil
Rapeseed oil
Pine seed oil
Olive oil
Corn oil
Cottonseed oil
Coconut oil
Hydroxylated oils, such as castor oil, etc.
Fish oils (train oils)

Linseed oil, soya bean oil and fish oils are especially desirable, although sunflower, rapeseed, corn and cottonseed oils are also important starting materials.

In addition to variations in procedure in accordance with the particular oil employed, the process is subject to other variations depending, principally, on the use to which the product is to be put. For purposes of describing and illustrating the invention, however, there is presented just below a full description of one complete process, the said process also being diagrammed in the acompanying drawing. After the description of this one particular process, possible variations are pointed out such, for example, as temperature and percentage ranges.

Assume that raw linseed oil is the primary starting material selected. The procedure may then be summarized as follows (the quantities mentioned in the several steps indicating proportions of materials, it being understood that a batch of any desired size may be carried through the process):

(1) 8014 gms. of raw linseed oil are heated up to 300° C. and the pressure reduced to 100 mm. of mercury; and during temperature rise and for five hours at 300° C., $SO_2$ is bubbled through the oil at an even rate of 20 gms. an hour.

(2) The vacuum is broken and the bubbling of $SO_2$ is terminated, permitting the pressure to rise to atmospheric pressure, and at this time, and also during steps 3, 4 and 5, a blanket of $SO_2$ is maintained on the surface of the batch.

(3) The batch is gently agitated for one-half hour and at the start of this period 106.6 gms. of NaOH flakes are added to the batch, the temperature still being maintained at 300° C.

(4) The agitation is terminated and the reaction vessel is again evacuated, to a pressure just short of that producing foaming, for instance, 400 mm. of mercury, this condition being maintained for an additional period of one-half hour, still at 300° C.

(5) Application of heat is terminated and the batch is allowed to cool to 200° C. (requiring about one and one-half hours), during which time the reduced pressure (400 mm. of mercury) is maintained.

(6) Upon reaching 200° C., the vacuum is broken by admitting air and the batch poured into a vulcanizing kettle.

(7) Upon further cooling to 135° C., a mixture of sulphur, zinc oxide and mercaptobenzothiazole pastes are added (550 gms. sulphur paste, 110 gms. ZnO paste and 64.2 gms. mercaptobenzothiazole paste), the batch being vigorously agitated during this addition, and the temperature dropping further to about 120° C.

(8) The temperature is then maintained at about 120° C. to 125° C. until the desired degree of vulcanization has taken place, which may require from about 2 to 2½ hours (calculated from the first addition of sulphur). Ways of determining when the desired degree of vulcanization is secured are set out more fully hereinafter.

(9) The vulcanized product is poured out to cool and set.

The following should be noted in connection with the several steps as numbered above:

*Step (1)—Bubbling of $SO_2$ through oil*

In connection with this step, it is first noted that other sulphur-containing gases may be used in place of $SO_2$. $SO_2$ and $H_2S$, however, are of especial importance. Mixtures of sulphur-containing gases may also be employed to advantage, or different gases (for instance, $SO_2$ and $H_2S$) may be used alternately.

Therefore, in the following discussion of step (1) of the process (based on the use of $SO_2$) it is to be kept in mind that other gases may be used and also that quantities and procedure may vary somewhat in accordance with the gas selected.

It is further to be observed that in the treatment with a sulphur-containing gas, it is important that good or intimate contact between the oil and gas be provided for. While I prefer bubbling the gas through the oil, this may not always be necessary, since maintenance of a blanket of gas at the surface of the batch may serve the purpose (depending upon other conditions, such as the circulation of the oil under the influence of the heating). Moreover, blanketing may even be preferred to bubbling under some circumstances, for instance, in the case of an oil having a strong tendency to foam.

During this step the oil is heat-bodied to an extent yielding a modified, heat-bodied oil product, having a viscosity (at atmospheric temperature) of from about V to Z6 on the Gardner scale, preferably Z4 to Z5. The sulphur-containing gas, such as the $SO_2$ mentioned in the specific example summarized above, brings about extensive changes in the oil undergoing treatment (probably both of a chemical and colloidal nature). For instance, the $SO_2$ increases the bodying speed. In a typical case, the time required to body the oil to the degree indicated just above was approximately one-half that required to secure equivalent body without the use of $SO_2$.

For the purpose of this step of the process, the temperature may range from about 200° C. to about 350° C., depending upon the oil being treated and also on other conditions, including especially the quantity of $SO_2$ which is bubbled through. For linseed oil I prefer a temperature between about 250° C. and about 310° C.

While it may not always be necessary or desirable to employ vacuum during step (1) of the process (either positive or negative pressures being possible under various circumstances), I prefer pressures below atmospheric, as is indicated in the summary of the specific process given above. Moreover, when employing vacuum, the pressure need not always accurately conform with the above specific example. In most instances, I prefer reduced pressure ranging from about 50 mm. to about 400 mm. of mercury.

The quantity of $SO_2$ bubbled through the oil may also be varied. Increase of $SO_2$ beyond a certain limit (with a given oil and under given conditions) will result in partial or complete gelation of the oil, this being an important factor to be considered in determining the quantity to be used. For each oil and set of operating conditions, I prefer to employ a quantity of $SO_2$ just short of that which will result in any appreciable formation of gel particles since, in this way, the most rapid bodying is attained consistent with a gel-free product.

In connection with this matter of gel formation, it is mentioned that there is a definite relationship between temperature and quantity of $SO_2$. Thus, with a given oil, increase of temperature also increases bodying speed, in view of which the maximum preferred quantity of $SO_2$ is reduced with increase in temperature, and vice versa.

It may be mentioned, however, that either the temperature or the quantity of $SO_2$, or both, may be reduced appreciably from the value giving highest bodying speed although, in such cases, additional time will be required to attain the desired degree of bodying (preferably Z4-Z5 on the Gardner scale).

As is indicated in the brief summary of step (1) above, the $SO_2$ is preferably bubbled through the oil not only during the five hour treatment period at 300° C., but also during initially raising the temperature from atmospheric temperature up to 300° C. When the quantity of $SO_2$ introduced is 20 gms. per hour for a batch of 8014 gms. of oil (which is a desirable working figure when treating linseed oil at 300° C.), and with allowance for about three hours in which to initially raise the temperature to 300° C., a total of about 160 gms. of $SO_2$ is employed in this step. Thus, the $SO_2$ used approximates 2% of the quantity of oil.

Step (2)—$SO_2$ blanket

Instead of bubbling $SO_2$ through the oil, after the initial five hour treatment period this bubbling is stopped and an $SO_2$ blanket is maintained at the surface of the batch. Concurrently, the vacuum pump is stopped, permitting the pressure to rise to atmospheric pressure.

The quantity of $SO_2$ employed for blanketing purposes is not critical, merely being sufficient to ensure the presence of an effective blanket in the reaction vessel employed.

This condition is maintained throughout steps (3), (4) and (5).

With reference to the employment of an $SO_2$ blanket, it is pointed out that the most important consideration here involved is the exclusion of air from the surface of the batch undergoing treatment. This may be accomplished in other ways than by employing an $SO_2$ blanket. Moreover, if a gas blanket is used for the purpose of step (2), gases other than $SO_2$ may be employed, such, for instance, as $CO_2$ or nitrogen.

Step (3)—Addition of NaOH flakes

Although I prefer employment of flake sodium hydroxide (this material being readily available), other forms of sodium hydroxide may be used. Moreover, other inorganic bases may be used in place of sodium hydroxide, particularly oxides or hydroxides of the following, all of which are capable of producing white sulphides upon reaction with sulphur:

| | |
|---|---|
| Lithium | Strontium |
| Sodium | Barium |
| Potassium | Zinc |
| Ammonium | Magnesium |
| Calcium | Aluminum |

In addition to the characteristic of producing white sulphides, which is of great importance in securing a product of light color, I have further found that the above listed bases also yield a product which has higher tensile strength than bases producing black sulphides.

Still further, the listed inorganic bases dissolve quickly in fatty oils, which is of advantage in carrying out the process for several reasons, including the fact that sludge is not produced, this being of importance from the commercial standpoint, since cleaning of sludge from reaction vessels is difficult.

Alkaline earth metals (calcium, strontium and barium) and alkali metals (sodium, potassium and lithium, as well as ammonium, which is classed with this group) are particularly suitable, the alkali metals being especially desirable where tensile strength is an important factor.

It is further mentioned that certain of the foregoing materials yield soaps having little or no solubility in water, in view of which I prefer use of a material selected from this group for certain products, such as those adapted for use in electrical insulating materials. Oxides and hydroxides of the following have this characteristic:

| | |
|---|---|
| Calcium | Zinic |
| Strontium | Magnesium |
| Barium | Aluminum |

The quantity of inorganic base employed will depend somewhat upon the use for which the product is being prepared and also upon other variables in the process, including the oil selected. Moreover, to achieve a given result under equal treatment conditions, the quantity of inorganic base will necessarily be varied in accordance with which base is selected. When using sodium hydroxide, the quantity is preferably kept between 0.1% and 5% and usually between 0.5% and 2.5%. I have secured especially desirable products when working between 1% and 2%.

For equivalent results, when other inorganic bases are employed, they are desirably used in proportions which are chemically equivalent to the ranges just indicated.

With the specific conditions of the illustrative process which is summarized above, the quantity of sodium hydroxide flakes is 1.33% of the oil.

During the addition of the inorganic base the batch is gently agitated, the agitation being continued preferably for a period of about one-half hour to ensure thorough dispersion of the base material.

The time of treatment with the inorganic base will depend on various conditions, such as temperature, but usually the time should be at least one-half hour.

It is to be noted that an important consideration in this phase of the process is the tendency for the batch to foam or froth at the time of addition of the inorganic base.

Although it may not always be required, I have found that appreciable rise in pressure at the time of addition of the inorganic base is of material assistance in controlling foaming. Thus, in the specific example given above, the pressure is permitted to rise to atmospheric pressure at the time of addition of sodium hydroxide. The temperature may also be permitted to drop somewhat during addition of the inorganic base.

However, in treating linseed oil, in accordance with the above specific example, I have found effective results are secured even without appreciable drop in temperature, provided the pressure is considerably increased as compared with the low pressure maintained during the initial five hour treatment period. In some cases, super-atmospheric pressure may assist in reducing foaming.

From the above it will be seen that the various degrees of pressure may be alternated during the process, for instance, so that super-atmospheric pressure may follow vacuum, and vacuum may again follow super-atmospheric treatment.

Step (4)

About one-half hour after the addition of the inorganic base, the danger of foaming is diminished, and the pressure is again reduced in the reaction vessel. Care should be taken not to reduce the pressure to a point causing any appreciable foaming. I have found, for instance, in the case of the above specific example, that a pressure of about 400 mm. of mercury was effective during this stage of the process, this condition being maintained with the temperature at 300° C. for a further period of about one-half hour. The preferred range of pressure for this stage of the process is, therefore, from 400 mm. of mercury up to atmospheric pressure. It may here be mentioned that the $SO_2$ treatment and the tretament with the inorganic base changes the physical characteristics of the oil in a number of respects, including consistency. If the oil at this stage is permitted to cool to atmospheric temperature, it becomes solid, having a consistency of about that of a heavy solid paste.

Upon completion of the treatment with the sulphur-containing gas and the inorganic base, the modified oil product, for convenience, may be termed the "intermediate."

Step (5)—Cooling

Application of heat is now terminated and the batch is permitted to cool to about 200° C., the reduced pressure (400 mm. of mercury) being maintained. The time required for cooling will naturally depend upon the size of the batch. In the illustrative process above described, the batch of 8014 gms. of oil requires about one and one-half hours to cool from 300° C. to 200° C.

Step (6)

Upon reaching 200° C. the vacuum is broken, permitting the pressure to rise to atmospheric pressure, and the delivery of $SO_2$ to the surface is terminated. Although with certain types of equipment the succeeding steps of the process may be carried out in the same reaction vessel employed for the first steps, for most purposes I prefer at this point to transfer the batch to a different type of treatment vessel, e. g., a vulcanizing kettle.

Steps (7) and (8)—Vulcanization

During transfer of the batch to a vulcanizing kettle, the temperature drops further, and upon reaching about 135° C., a sulphur paste is added, the batch being vigorously agitated during this addition. In the illustrative process described above, 550 gms. of sulphur paste are used. This paste thus comprises about 15% of the weight of the batch. The paste is preferably prepared of finely ground sulphur dispersed in linseed oil in the proportions of two parts by weight of sulphur to one part by weight of linseed oil. The sulphur thus constitutes about 10% of the solidified oil or intermediate.

Several variables may here be introduced, depending upon the oil selected, the use of the product and other treatment conditions, and also upon whether or not vulcanization accelerators are used.

In general, employment of higher vulcanization temperatures requires less sulphur, and vice versa. The vulcanization temperature, however, is preferably maintained between about 110° C. and 180° C. and most advantageously between about 110° C. and 140° C. and the quantity of sulphur from about 1½ parts to about 50 parts for each 100 parts of intermediate (parts by weight).

With linseed oil, I prefer a temperature between about 120° C. and 125° C., and from about 7% to about 12% of sulphur when accelerators are used, although as high as about 20% may be required in the absence of accelerators. Accelerators reduce the temperature and/or time of vulcanization required and/or the quantity of sulphur needed.

In the case of oils which are less active than linseed oil, for instance soya bean oil, higher vulcanization temperatures and/or sulphur content are needed; and, on the other hand, in the case of oils which are more active than linseed oil, for instance dehydrated castor oil, oiticica oil or China-wood oil, lower vulcanization temperatures and/or sulphur content are needed.

As indicated in the foregoing illustrative process, other materials, such as accelerators (mercaptobenzothiazole or tetramethylthiuram disulfide or others), may if desired be added at the time of vulcanization. Thus, as indicated in the illustrative process, mercaptobenzothiazole may be used as an acelerator, and zinc oxide as an activator of the accelerator. These additional materials may also be added in the form of pastes, and when this is done I prefer to conjointly introduce these materials with the sulphur paste, all three materials being mixed together. The zinc oxide paste (110 gms. in the illustrative process) constitutes about 3% of the batch under treatment, the paste being composed of zinc oxide and linseed oil in the proportions of about two parts of the former to about one part of the latter. The zinc oxide thus constitutes about 2% of the batch under treatment. The 64.2 gms. of mercaptobenzothiazole paste referred to in the illustrative process constitute about 1.75% of the batch, being composed of 1% mercaptobenzothiazole and 0.75% linseed oil.

The introduction of the sulphur (and other materials for vulcanization) in paste form of the type described above is desirable to facilitate dispersion in the batch and also to reduce the extent of agitation required in order to effect uniform and thorough dispersion. However, it is not of vital concern from the standpoint of the reactions themselves that the sulphur and other materials added for vulcanization be incorporated in the form of paste, and where effective means of agitation are provided, the vulcanizing agents may be added in other forms such, for instance, as powders, or the sulphur may be added in molten form.

It may be mentioned that uniformity of temperature throughout all parts of the batch during the vulcanization period is important, in order to ensure uniformity of vulcanization throughout the batch. The indirect application of heat during this portion of the process is preferred, because of the stability of temperature provided thereby, although if the agitation is sufficiently vigorous, uniformity may be secured even with application of direct heat.

It will be observed from the brief summary of the illustrative process that introduction of the vulcanizing materials takes place at about 135° C. and results in a further temperature drop to about 120° C., 120° C. to 125° C. being very effective for vulcanizing linseed oil with the quantity of sulphur specified.

In determining the progress of vulcanization, the consistency of the mass is observed. For most purposes, the desired degree of vulcanization is attained when the mass thickens to the degree rendering further agitation difficult, if not impractical. As a further test, a paddle may be inserted in the mass, and when the mass shows a tendency to break away from the paddle as it is drawn out, the proper degree of vulcanization has been reached. Still another test which may be used is the placing of sample drops on a flat surface, such as cardboard, glass or metal plate, and when such drops, even though sticky, may be rolled off with the finger, the vulcanization is sufficient.

The foregoing tests are given since the actual time varies from batch to batch, although with linseed oil treated in accordance with the illustrative process herein fully disclosed, the vulcanization time will frequently fall between about 2 and 2½ hours (calculated from the first addition of sulphur). With other oils and with variations of the process in accordance with the above description, the time may be either shorter or longer (for instance, up to seven or even nine hours).

When vulcanization to the desired degree is completed, the product is poured into any suitable molds or containers for cooling, as mentioned in step (9).

Some factors bearing on the use of my improved extender in rubber mixes should be noted, as follows:

First, as is known, vulcanized oils have most commonly been incorporated in rubber mixes at the time they are masticated on the rubber mill for compounding purposes, for instance, for compounding the rubber with fillers, pigments, or the like. In accordance with usual procedure, the masticated and compounded rubber is thereafter placed in a mold, usually under both heat and pressure, for the purpose of vulcanization to the degree desired in the finished product.

My improved extender is well adapted to be added to rubber mixes during the compounding procedure and is, in fact, of material advantage in the masticating because of the plasticizing effect of the extender. Mastication may be completed more readily and in less time in the presence of my improved extender than is required for masticating rubber alone.

The improved extender produced in accordance with this invention has the further advantage that upon the final vulcanization of the product, since the extender is vulcanizable at the same temperatures as the rubber, the vulcanization of the extender progresses and the extender concurrently loses at least a major portion of its plasticizing characteristic. This is important since the product is thereafter not sticky or tacky.

With the foregoing in mind, it is contemplated in accordance with this invention that the degree to which the extender is vulcanized prior to addition to the rubber mix shall be considerably less than that desired in the finished rubber product; and preferably, the degree of vulcanization prior to admixture with the rubber mix is such that the final vulcanization of the rubber product will substantially completely eliminate the plasticizing characteristic.

The effect of operating in this way and of the fact that my improved extender has a vulcanization temperature approximating that of rubber, is to make possible the use of much larger proportions of extender than could practically be employed heretofore without adversely influencing the qualities and characteristics of the final product.

I have found that my improved extender mixes well with rubber and produces a product of good texture and other characteristics. Moreover, I believe that the improved extender may even form a co-polymer vulcanization product with the rubber, during the final vulcanization of the product.

From the foregoing discussion of the process for making the extender, it will be noted that the several sequential steps are preferably carried out without interruption, notwithstanding the fact that the process in general consists of two phases—(1) bodying of the oil, and (2) vulcanization. These two phases of the process may be separated and carried out substantially independently, permitting the bodied oil to cool to atmospheric temperature, so as to facilitate storage and/or shipment of the "intermediate" product, but there are advantages in carrying out the process in the continuous manner described. In the first place, the process may be conducted more economically if the intermediate is not permitted to return to atmospheric temperature prior to vulcanization. In this way, the heat required to again raise the temperature to the vulcanization point is saved.

Beyond the foregoing, I have found an unexpected advantage in carrying out the process continuously, as follows:

If the sulphur for vulcanization is added to the intermediate at an elevated temperature, preferably not below that to be employed during the vulcanization period (but not above about 180° C.), the actual time required at vulcanization temperature is markedly less than is necessary where the intermediate has been permitted to cool to atmospheric temperature and is then re-heated to vulcanization temperature.

Because of the foregoing, it is desirable to arrange the equipment employed for the process in a manner providing either for effecting all steps of the process in a single reaction vessel, or for flow of the intermediate substantially directly from the heat-bodying vessel to the vulcanization vessel. In this way, the sulphur (and any other materials added at the time of vulcanization)

may most effectively be introduced without necessitating drop in temperature of the intermediate below the temperature to be maintained during the vulcanization period.

Other vulcanizable materials may be present during the carrying out of the process, especially during the vulcanization step. For instance, non-oily materials, such as pitches, tars, asphalts, and other bituminous products (mineral rubber), mineral oils, rosin, resins, etc., may be present and simultaneously vulcanized with the heat-bodied intermediate.

In conclusion, it is mentioned that one of the problems commonly encountered in the treatment of fatty oils is foaming or frothing. Foaming is disadvantageous for a number of reasons in carrying out the process and, moreover, is very dangerous, sometimes leading to fires.

A very important advantage of the process as herein disclosed is that the treatments may be carried out without appreciable foaming. Several different steps of the process contribute to this advantage. For instance, the manner of treatment to body the oil with a sulphur-containing gas is of importance in securing the desired degree of bodying without giving rise to appreciable foaming. Similarly, use of an inorganic base selected from the class hereinbefore listed also enables carrying out this phase of the process without appreciable foaming.

In fact, the foregoing two major steps involved in the heat-bodying of the oil, especially when these steps are carried out under other reaction conditions as fully described above, enables production of the intermediate product with a minimum of foaming difficulty which has been so troublesome heretofore.

It is further mentioned that the treatment with the sulphur-containing gas is of great importance in yielding a product which, upon vulcanization, has certain characteristics quite closely resembling those of rubber. In this connection, it is important that, when operating according to my method, the reaction product which constitutes the extender does not contain oil ingredients which have not been subjected to the treatment with sulphur-containing gas.

I claim:

1. A process for making a rubber extender comprising heating a batch of linseed oil to a temperature in the neighborhood of 300° C. under a pressure considerably reduced from atmospheric pressure; for a period of several hours at said temperature and pressure, bubbling sulphur dioxide through the batch; then adding up to 5% sodium hydroxide to the batch at said temperature but under an increased pressure and maintaining said temperature for a period of at least one-half hour after addition of the sodium hydroxide; after addition of the sodium hydroxide again reducing the pressure for a period of time; effecting reduction in temperature of the batch, but without permitting the temperature to drop below about 120° C., adding sulphur to the batch, and vulcanizing the batch by maintaining the temperature thereof at from about 120° C. to 125° C.

2. A process in accordance with claim 1 in which air is excluded from the surface of the batch during the addition of the sodium hydroxide.

3. A process in accordance with claim 1 in which air is excluded from the surface of the batch during the addition of the sodium hydroxide and during the later period in which temperature drop occurs.

4. A process for making a rubber extender comprising heating a batch of a fatty oil to a temperature of from about 200° C. to about 350° C. at a pressure of from about 50 mm. of mercury to about 400 mm. of mercury; for a period of several hours at said temperature and pressure, bubbling a sulphur-containing gas through the batch, said gas being selected from the class consisting of $SO_2$ and $H_2S$; then adding to and dispersing in the oil an inorganic base selected from the class consisting of oxides and hydroxides of lithium, sodium, potassium, ammonium, calcium, strontium, barium, zinc, magnesium and aluminum, the quantity of the inorganic base being equivalent to from about .1% to about 5% of sodium hydroxide in proportion to the oil; thereafter effecting drop in temperature to a point between about 110° C. to 180° C. and during said drop in temperature adding sulphur to the batch, and effecting vulcanization by heating the sulphur-containing batch at a temperature between about 110° C. and about 180° C.

5. A process in accordance with claim 4 in which the pressure is increased at the time of addition of the inorganic base.

6. A process in accordance with claim 4 in which the pressure is increased at the time of addition of the inorganic base and in which the pressure is thereafter again decreased to a point between atmospheric pressure and 400 mm. of mercury.

7. In the preparation of fatty oils for subsequent vulcanization, the steps which comprise heating a batch of a fatty oil to a temperature between about 200° C. and about 350° C. at a pressure between about 50 mm. of mercury and about 400 mm. of mercury; for a period of several hours at said temperature and pressure, treating the batch with a sulphur-containing gas selected from the class consisting of $SO_2$ and $H_2S$ by bringing said gas into intimate contact with the batch; and then effecting an increase in pressure and adding to and dispersing in the oil an inorganic base selected from the class consisting of oxides and hydroxides of lithium, sodium, potassium, ammonium, calcium, strontium, barium, zinc, magnesium and aluminum, the quantity of the inorganic base being equivalent to from about .1% to about 5% of sodium hydroxide in proportion to the oil.

8. A process in accordance with claim 7 in which the treatment with gas is terminated at about the time of addition of the inorganic base and in which the air is excluded from the surface of the batch during said addition of the inorganic base.

9. A process in accordance with claim 7 in which the pressure is again reduced after addition of the inorganic base, the temperature being maintained between about 200° C. and 350° C. for at least one-half hour after addition of the inorganic base.

10. A process in accordance with claim 7 in which the temperature during the treatment with gas is maintained between about 250° C. and 350° C., and in which the temperature is reduced at least to 200° C. during a period of time following addition of the inorganic base, in which period the pressure is again reduced.

11. A process in accordance with claim 7 in which the temperature during the treatment with gas is maintained between about 250° C. and 350° C., and in which the temperature is reduced at least to 200° C. during a period of time following addition of the inorganic base, in which period the pressure is again reduced, said process further being characterized by exclusion of air from the surface of the batch during said drop in temperature.

12. A process in accordance with claim 7 in which the temperature during the treatment with gas is maintained between about 250° C. and 350° C., and in which the temperature is reduced at least to 200° C. during a period of time following addition of the inorganic base, in which period the pressure is again reduced, said process further being characterized by exclusion of air from the surface of the batch during addition of the inorganic base and during said drop in temperature.

13. In a process for making a rubber extender, the steps which comprise heating a batch of a fatty oil to a temperature between about 200° C. and 350° C.; for a period of at least several hours at said temperature, subjecting the batch to intimate contact with sulphur dioxide; and then adding an inorganic base selected from the class consisting of oxides and hydroxides of lithium, sodium, potassium, ammonium, calcium, strontium, barium, zinc, magnesium and aluminum, the quantity of inorganic base being equivalent to not more than 5% of sodium hydroxide in proportion to the oil, and maintaining the temperature between about 200° C. and 350° C. until at least partial dissolution of said base; and thereafter vulcanizing the mixture.

14. In a process for heat-bodying a fatty oil, the steps which comprise heating a batch of fatty oil in intimate contact with a sulphur-containing gas selected from the class consisting of $SO_2$ and $H_2S$ to a temperature between about 200° C. and 350° C. for a period of several hours, the quantity of said gas being in the neighborhood of but below that at which any appreciable gel formation takes place; after said period of several hours at said temperature dispersing in the batch an inorganic base selected from the class consisting of oxides and hydroxides of lithium, sodium, potassium, ammonium, calcium, strontium, barium, zinc, magnesium and aluminum, the quantity of the inorganic base being equivalent to from about .1% to about 5% of sodium hydroxide in proportion to the oil; and subsequently vulcanizing the batch.

15. A process in accordance with claim 14 in which the treatment of the oil with a sulphur-containing gas is effected by bubbling said gas through the oil.

16. In a process for making a rubber extender, the steps which comprise heating a batch of a fatty oil to a temperature between about 200° C. and 350° C.; for a period of at least several hours at said temperature, bringing said oil and a sulphur-containing gas selected from the class consisting of $SO_2$ and $H_2S$ into intimate contact with each other; then adding an inorganic base selected from the class consisting of oxides and hydroxides of lithium, sodium, potassium, ammonium, calcium, strontium, barium, zinc, magnesium and aluminum, the quantity of inorganic base being equivalent to not more than 5% of sodium hydroxide in proportion to the oil, and maintaining the temperature of the batch between about 200° C. and 350° C. for a further period of at least one-half hour; and thereafter vulcanizing the batch with sulphur at a temperature between about 110° C. and 180° C.

17. A process in accordance with claim 16 in which the sulphur-containing gas is sulphur dioxide.

18. A process in accordance with claim 16 in which the sulphur-containing gas is bubbled through the oil.

19. A process in accordance with claim 16 wherein the treatment with a sulphur-containing gas is carried on under vacuum.

20. A process in accordance with claim 16 in which the inorganic base is sodium hydroxide.

21. A process in accordance with claim 16 in which vulcanization is effected at a temperature between about 110° C. and 125° C.

22. In the manufacture of a rubber extender for use in a rubber mix adapted to be compounded on a rubber mill and thereafter vulcanized, the steps of heat-bodying a fatty oil at a temperature of from 200° C. to 350° C. and in intimate contact with a sulphur-containing gas selected from the class consisting of $SO_2$ and $H_2S$ until the oil has a viscosity (at room temperature) of from V to Z6 on the Gardner scale; thereafter adding an inorganic base to the oil selected from the class consisting of oxides and hydroxides of lithium, sodium, potassium, ammonium, calcium, strontium, barium, zinc, magnesium and aluminum, the quantity of the inorganic base being equivalent to from about .5% to about 2.5% of sodium hydroxide in proportion to the oil, and maintaining the temperature of the oil between about 200° C. and 350° C. for a period of time after addition of said inorganic base sufficient to yield a product of consistency approximating that of a soft-solid paste (at room temperature); and thereafter vulcanizing the treated oil to a degree such that when globules are placed on a smooth surface they may be rolled off with the finger, but to a degree insufficient to destroy the plasticizing property of the extender, the degree of vulcanization further being such that continued vulcanization of the compounded rubber mix subsequent to the milling operation will result in covulcanization of both the rubber and the extender and in elimination of stickiness of the extender in the final vulcanized compound.

23. A process in accordance with claim 16 wherein said inorganic base is an alkali metal oxide.

24. A process in accordance with claim 16 wherein said inorganic base is an alkali metal hydroxide.

LASZLO AUER.

REFERENCES CITED

The following references are of record in the file of this patent:

UNITED STATES PATENTS

| Number | Name | Date |
| --- | --- | --- |
| 1,758,420 | Ahrens | May 13, 1930 |
| 1,957,437 | Auer | May 8, 1934 |
| 1,985,231 | Auer | Dec. 25, 1934 |
| 2,083,549 | Auer | June 15, 1937 |
| 2,188,916 | Waterman | Jan. 23, 1940 |
| 2,234,545 | Auer | Mar. 11, 1941 |
| 2,234,949 | Auer | Mar. 18, 1941 |
| 2,298,916 | Auer | Oct. 13, 1942 |

FOREIGN PATENTS

| Number | Country | Date |
| --- | --- | --- |
| 2,359 | Great Britain | 1855 |